(12) United States Patent
Riegman

(10) Patent No.: US 9,551,607 B2
(45) Date of Patent: Jan. 24, 2017

(54) RADAR LEVEL MEASUREMENT

(75) Inventor: Klement Riegman, Sittard (NL)

(73) Assignee: STAMICARBON B.V., Sittard (NL)

(*) Notice: Subject to any disclaimer, the term of this patent is extended or adjusted under 35 U.S.C. 154(b) by 316 days.

(21) Appl. No.: 14/126,394

(22) PCT Filed: Sep. 3, 2012

(86) PCT No.: PCT/NL2012/050603
§ 371 (c)(1),
(2), (4) Date: Mar. 11, 2014

(87) PCT Pub. No.: WO2013/036108
PCT Pub. Date: Mar. 14, 2013

(65) Prior Publication Data
US 2014/0191898 A1    Jul. 10, 2014

(30) Foreign Application Priority Data
Sep. 6, 2011 (EP) .................................. 11180241

(51) Int. Cl.
| | | |
|---|---|---|
| *G01F 23/284* | (2006.01) | |
| *H01Q 1/22* | (2006.01) | |
| *H01Q 13/20* | (2006.01) | |
| *H01Q 13/24* | (2006.01) | |
| *G01S 13/88* | (2006.01) | |

(52) U.S. Cl.
CPC .............. *G01F 23/284* (2013.01); *G01S 13/88* (2013.01); *H01Q 1/225* (2013.01); *H01Q 13/20* (2013.01); *H01Q 13/24* (2013.01)

(58) Field of Classification Search
CPC ........ G01F 23/284; G01F 13/88; H01Q 1/225; H01Q 13/20; H01Q 13/24
USPC .......................................... 342/124; 73/290 R
See application file for complete search history.

(56) References Cited

U.S. PATENT DOCUMENTS

| | | | | |
|---|---|---|---|---|
| 2,375,084 A | * | 5/1945 | Coroniti ................ | G01F 23/263 331/181 |
| 5,136,299 A | * | 8/1992 | Edvardsson .......... | F17C 13/021 342/124 |
| 5,582,656 A | * | 12/1996 | Kangas ................... | C22C 38/44 148/325 |

(Continued)

FOREIGN PATENT DOCUMENTS

| | | |
|---|---|---|
| CN | 201152765 | 11/2008 |
| WO | WO-95/00674 | 1/1995 |

(Continued)

OTHER PUBLICATIONS

International Search Report for PCT/NL2012/050603, mailed Oct. 15, 2012, 3 pages.

(Continued)

*Primary Examiner* — Peter Bythrow
(74) *Attorney, Agent, or Firm* — Morrison & Foerster LLP

(57) ABSTRACT

Disclosed is a method of measuring the level of a liquid in a vessel, such as a chemical reactor, by radar. The method particularly pertains to situations wherein a supercritical fluid is present above the liquid. More particularly, the method serves to cope with the typical vigorous circumstances of a chemical reaction, such as urea synthesis. The invention foresees the use of a tube extending into the liquid, so as to guide the radar waves to the surface level of the liquid.

17 Claims, 2 Drawing Sheets

(56) References Cited

U.S. PATENT DOCUMENTS

| | | | | |
|---|---|---|---|---|
| 6,184,818 B1* | 2/2001 | Meinel | ............... | G01F 23/284 324/642 |
| 6,538,598 B1* | 3/2003 | Wilkie | ............... | G01F 23/284 342/124 |
| 6,795,015 B2* | 9/2004 | Edvardsson | ........... | G01F 23/284 342/118 |
| 6,915,689 B2* | 7/2005 | Edvardsson | ........... | H01Q 1/22 324/637 |
| 6,988,404 B2* | 1/2006 | Motzer | ............... | B08B 1/008 73/290 R |
| 7,347,903 B2* | 3/2008 | Yamadera | ........... | C22C 38/001 148/325 |
| 7,392,699 B2* | 7/2008 | Motzer | ............... | B08B 1/008 73/290 R |
| 7,532,155 B2* | 5/2009 | Kleman | ............... | G01F 23/284 342/1 |
| 8,100,006 B2* | 1/2012 | Galloway | ........... | G01F 23/0061 73/290 R |
| 2002/0084931 A1* | 7/2002 | Bletz | ............... | G01F 23/284 342/124 |
| 2004/0145510 A1* | 7/2004 | Edvardsson | ........... | G01F 23/284 342/5 |
| 2007/0085729 A1* | 4/2007 | Edvardsson | ........... | G01F 23/284 342/124 |
| 2007/0090992 A1* | 4/2007 | Edvardsson | ........... | G01F 23/284 342/124 |
| 2007/0139256 A1* | 6/2007 | Edvardsson | ........... | G01F 23/284 342/124 |
| 2009/0249870 A1* | 10/2009 | Volpe | ............... | G01F 23/284 73/290 R |
| 2011/0109496 A1* | 5/2011 | Van Den Berg | ..... | B22D 11/041 342/124 |
| 2012/0169527 A1* | 7/2012 | Edvardsson | ........... | G01F 23/284 342/124 |
| 2013/0009803 A1* | 1/2013 | Edvardsson | ........... | G01F 23/284 342/124 |
| 2015/0084809 A1* | 3/2015 | Flasza | ............... | G01F 23/284 342/124 |

FOREIGN PATENT DOCUMENTS

| | | |
|---|---|---|
| WO | WO-03/095954 | 11/2003 |
| WO | WO-2004/046663 | 6/2004 |

OTHER PUBLICATIONS

Notification of the Second Office Action (translation) for CN 201280029486.0, mailed Mar. 1, 2016, 11 pages.

* cited by examiner

RADAR LEVEL MEASUREMENT

CROSS-REFERENCE TO RELATED APPLICATIONS

This application is the national phase of PCT application PCT/NL2012/050603 having an international filing date of 3 Sep. 2012, which claims benefit of European application No. 11180241.9, filed 6 Sep. 2011. The contents of the above patent applications are incorporated by reference herein in their entirety.

FIELD OF THE INVENTION

The invention pertains to a method for detecting the level of a liquid in a vessel, such as a reactor, wherein a supercritical fluid is present above said liquid. The invention particularly pertains to the measurement of the level of liquid in a reactor for the synthesis of urea from ammonia and carbon dioxide. The invention also pertains to a device for determining the level of a liquid in the foregoing circumstances.

BACKGROUND OF THE INVENTION

In conducting chemical processes, it is regularly desired to monitor the level of liquid in the device in which such a process takes place. Whilst many methods exist to detect the level of liquid in a biphasic system of liquid and gas, this is less straightforward in circumstances where the liquid is present in conjunction with a supercritical phase. The supercritical phase, which is neither a strict gas phase, nor a strict liquid phase, is difficult to discriminate from the liquid phase. This problem becomes even more manifest, if (as will frequently be the case under the circumstances where a liquid and a supercritical phase co-exist in a chemical reaction), the liquid is a boiling liquid. Moreover, the detection of the level of liquid is particularly problematic in the event of reaction systems involving corrosive substances. A most prominent example of such a system is in the production of urea, by synthesis from ammonia and carbon dioxide. This reaction involves the formation of carbamate, which results in an extremely corrosive mixture of urea and carbamate in the urea synthesis section. This puts even more severe limits on the detection methods available.

The conventional method to date comprises radioactive measurements. The use of radioactive materials, however, comes with a plurality of drawbacks. These do not only concern the potential hazards, and required safety handling, of the radioactive material themselves, but also the social consequences of a negative public opinion, and the economical and regulatory consequences of authorities putting limits on granting permissions for the use of radioactive materials. These radioactive measurements are also very maintenance intensive. Hence, a technical solution is required that allows avoiding the use of radioactive materials in the monitoring of levels of liquid in a urea synthesis section, or in other systems where a liquid is present in conjunction with a supercritical phase.

Radar (originally an acronym for "radio detection and ranging") is a well-known object-detection system which uses electromagnetic waves—specifically radio waves—to determine the range, altitude, direction, or speed of both moving and fixed objects. A radar dish, or antenna, transmits pulses of radio waves or microwaves which bounce off any object in their path. The object returns a tiny part of the wave's energy to a dish or antenna which is usually located at the same site as the transmitter. Background art includes the use of radar to measure the level of liquids.

On the 11th Stamicarbon Urea Symposium (2008) it was proposed to use radar for the measurement of the level of liquid in a urea synthesis. The proposal entails the use of a horn antenna in the reactor and a standpipe in the stripper. The antenna serves to transmit a radio signal from a transmitter towards the media in a vessel, and to receive back echo signals that result from the radio signal encountering a reflecting target. For the horn type antenna it was conceived that the surface of the level of liquid in the reactor would constitute such a reflecting target, and the resulting echo would form a detectable signal.

However, in practice the method turned out to fail. Whilst the precise reasons cannot be easily established, it is clear that the ratio of signal to noise (S/N ratio) is highly unfavorable in systems wherein the interface to be detected is that between a liquid and a supercritical fluid. The S/N ratio is particularly unfavorable in systems such as a reactor for the synthesis of urea from carbon dioxide and ammonia, which not only involves the presence of a liquid and a supercritical fluid, but wherein the liquid itself will generally be boiling. This is all the more problematic since, particularly in the aforementioned synthesis of urea, the extreme corrosiveness of the reaction mixture puts severe limits on the availability of any systems for monitoring the level of liquid, let alone of systems other than those involving radioactivity.

Background art further includes a form of "guided radar" level measurement, used for measuring the level of a liquid in a container, such as a reaction vessel. The prior art technique operates by guiding radar pulses along a rod. This type of radar level measurement, along a duplex steel rod, is foreseen in the aforementioned Urea Symposium reference.

Background art includes WO 2004/046663. Herein an apparatus and method for radar-based level gauging is described, wherein a microwave signal is sent through a waveguide. The method is described for the purpose of measuring the level of a liquid, such as petroleum, in a situation where a gas, such as air, is present above the liquid. The disclosure neither addresses the specific situation of a liquid which has a supercritical fluid above it, nor the specific situation of a liquid which is present at the time of conducting a chemical reaction, under vigorous conditions. Rather, the disclosure is directed to level measurement of liquids in typically static situations.

Another background reference on the measurement of a level of liquid in a vessel, using radar, is US 2004/145510. Herein too, a static situation in a vessel is addressed, rather than at a dynamic situation when a chemical reaction under vigorous conditions is conducted in the vessel. Also, the reference does not address the specific measurement of a level of liquid in a situation where a supercritical fluid is present above said liquid.

It is now desired to provide a method for monitoring the level of a liquid in a system wherein both a liquid and a supercritical fluid are present. It is furthermore desired to provide a method for monitoring the level of liquid in the event that the liquid below the supercritical fluid is boiling. It is particularly desired to provide a method for detecting the level of liquid in a reactor for the synthesis of urea from carbon dioxide and ammonia.

SUMMARY OF THE INVENTION

In order to better address one or more of the foregoing desires, the invention presents, in one aspect, a radar method for detecting the level of a liquid in a vessel wherein a supercritical fluid is present above said liquid, the method comprising transmitting electromagnetic waves into the direction of the liquid, the method being conducted using a tube through which waves are transmitted, wherein the tube extends to a bottom end placed within the vessel above a desired minimum level of the liquid, and wherein the end part is defined by a reflective surface, the tube further comprising at least one hole for venting gas, and at least one hole for allowing liquid to enter. In one embodiment the latter hole is positioned near or at the bottom end of said tube.

In another aspect, the invention pertains to a system for detecting the level of a liquid in a vessel, such as a reactor, the system comprising a radio transmitter, a radio receiver, a signal processing device, and a display device to show the measurement results.

DETAILED DESCRIPTION OF THE INVENTION

Figure 1:
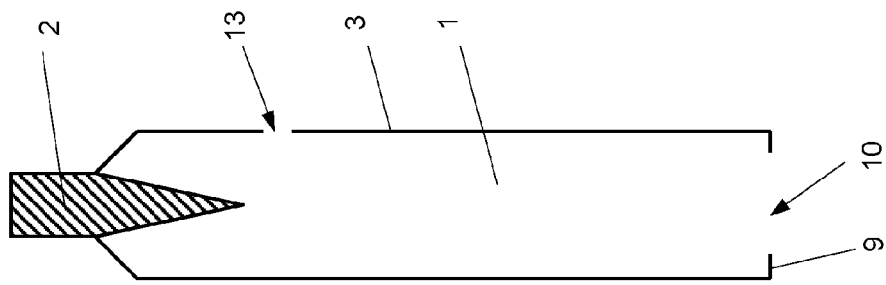
FIG. 1 depicts a cross-section of a radar tube (1) as used in the present invention, provided on top with a radar cone (2), and comprising a circular wall (3) and a bottom plate (4). The wall (3) is provided with an entry hole (5) and a vent hole (13), and the bottom plate (4) is provided with a drain and entry hole (6)
Figure 2:
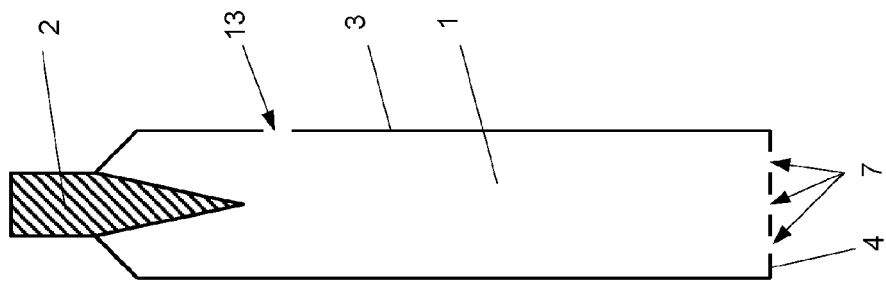
FIG. 2 presents a radar tube (1) in cross-section as in FIG. 1, provided on top with a radar cone (2), and comprising a circular wall (3) provided with a vent hole (13), and a bottom plate (4). The bottom plate (4) is provided with holes (7).
Figure 3:
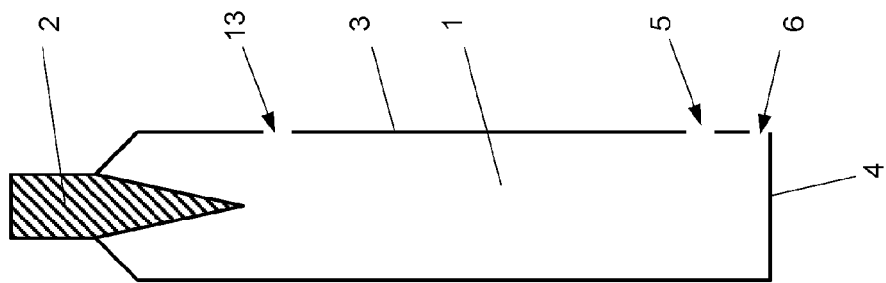
FIG. 3 depicts a radar tube (1) in cross-section, provided on top with a radar cone (2), and comprising a circular wall (3) provided with a vent hole (13). In this embodiment of the invention, the tube is provided with a bottom reflective element (8) in the form of a reflective surface (9) surrounding an open circle (10).

The invention addresses the challenge to measure the level of liquid in the specific situation of a liquid that has a supercritical fluid above it, particularly a liquid phase which effectively is boiling and which has a very uneven surface. Typically, this refers to a liquid that is subject to vigorous movement, such as a boiling liquid during a chemical reaction.

The invention is based on the unexpected finding that a tube, rather than a horn type radar (free space radar) is capable of achieving this.

The solution according to the invention, is to provide a tube so as to guide the radar waves inside the tube to the surface of the liquid to be measured, without condensation occurring at the radar transmitter. Without wishing to be bound by theory, the inventors found that such condensation is among the reasons why the, originally promising, radar level measurement method disclosed in the aforementioned symposium, in practice after a short time starts to yield unreliable measurement results.

The invention requires the presence of a reflective surface at the bottom of the tube. This serves two purposes. One is providing a means to detect the bottom of the pipe. The other purpose however, in synergistic effect with the at least one hole, is to provide a restriction for the liquid to enter, thereby reducing the movement of the liquid surface. This allows for a better detection of the interface between the supercritical fluid and the liquid phase.

The number and size of the holes is a design consideration which will depend on the need to detect quick level changes as well as the properties of the liquid, e.g. the viscosity. These can be easily determined by the person skilled in the art.

According to the invention, it is further foreseen to include provisions in the tube so as to allow the liquid, the level of which is to be measured, to enter it, and gas to exit it.

In order to measure the level of liquid in the extremely corrosive circumstances of a reactor for the synthesis of urea, the invention, in a preferred embodiment, provides the use of materials that are resistant towards such corrosion.

The term "radar" refers to a known technique in which electromagnetic waves (microwaves, radio waves) are transmitted, and reflection encountered by the transmitted waves is received. The transmission involves a transmitter. The reflected waves can be received by a separate receiver, or the transmitter and the receiver can be one and the same device. Typically, the radar equipment used will also comprise at least one signal processing device, that serves to process the relevant parameters of the waves transmitted and reflected, and on the basis thereof calculate the position of the surface on which the reflection occurs. In radar level measurement of a liquid, this surface is the surface of the liquid. The relevant parameters will, ultimately, be linked to the distance between the transmitter (or any other fixed calibration point), and the surface of the liquid. Frequently, distances in radar measurement are determined on the basis of time of flight of the signal. Basically, any type of radar equipment can be used. Such equipment includes, e.g., a transmitter, a receiver, signal processing device, and a display device to show the measurement results. Whilst the invention requires the use of a tube to propagate the radar waves towards the liquid, it further expressly is capable of using known radar equipment. Such equipment is known to the skilled person. A reference in this respect is Radar level measurement. The user's guide by Peter Devine. ISBN 0-0538920-0-X The electromagnetic waves used (radio waves, microwaves, in this disclosure also called "radar waves") can be within normal wavelength and frequency ranges, as known in the art. The radar waves are normally sent in pulses, the duration and intervals of which are also known in the art.

The tube used in the present invention extends into the vessel. This can be substantially vertically (i.e. making an angle of about 90° with the liquid if in an undisturbed state). It will be understood that the angle can deviate from 90°. In practice, depending on the size and shape of the vessel, the angle can be widely different from 90°, e.g. of from 0° to 180° or more, as long as the tube sufficiently allows to be filled with liquid at a level that is representative for the level of the liquid in the vessel. E.g., if the tube extends vertically (90°) it will be understood that the level of liquid in the tube should normally be the same as the level of liquid surrounding the tube. This may be different in the event that the tube makes a substantial angle with the surface of the liquid. In such a case, the level of liquid in the tube may be higher than the level of liquid surrounding the tube. It will be understood that the level in the tube, where reflection of radar waves occurs, also in the latter embodiment will be representative for the level of the surrounding liquid, and will just require a different calibration calculation.

In preferred embodiments, the angle as defined above is either 90° or 180°.

Figure 4:
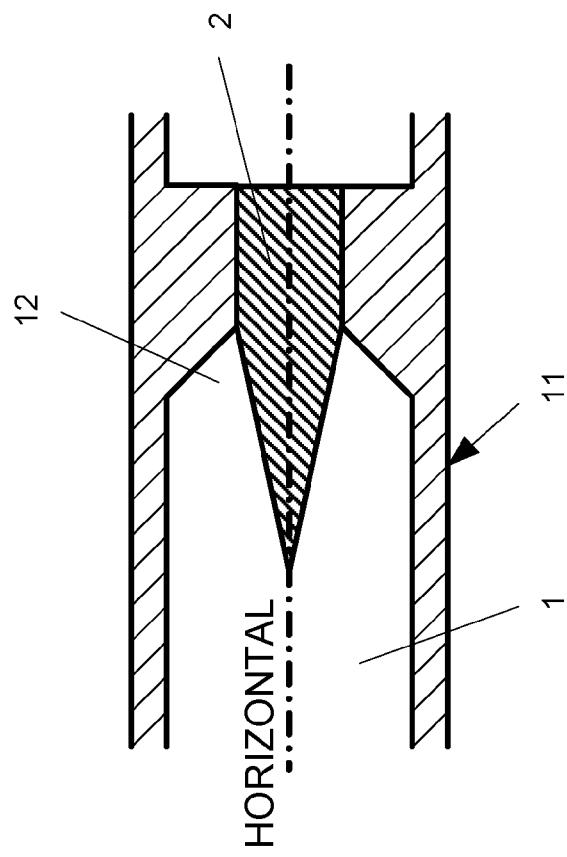
FIG. 4 shows two embodiments of positioning the radar tube of the invention: (a) vertical; (b) horizontal. Shown are, in cross-section, part of the tube (1), having a wall (11) and a radar cone (2). The tube (1) has a cone-shape on the inside of the end-part (12) adjacent to the radar cone (2).
Figure 4:
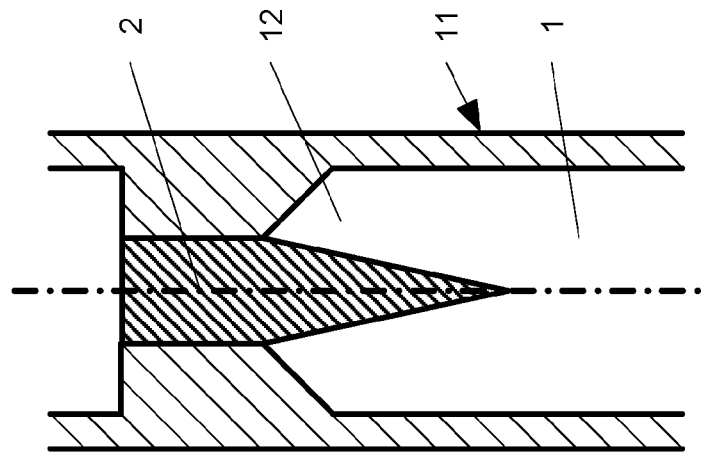

The former implies a substantially vertical arrangement of the radar tube, as depicted in FIG. 4(a). This has advantages for the draining of any condensate formed, as the arrangement avoids a too small angle that could allow accumulation of liquid. Also, in an embodiment where the tube is significantly cone shaped (the end-part (12) shown in FIG. 4), the fully vertical arrangement avoids that the top part of the tube could be positioned under a small angle with the horizontal, which would adversely affect gravity flow.

The latter (180°) implies a substantially horizontal arrangement (as depicted in FIG. 4(b) with a side entry and a bent pipe. Here too, avoiding a large deviation from 180°, will secure the avoidance of accumulation of condensate. The preferred cone-shaped tube (see the end-part (12) in FIG. 4) contributes to condensate formed against the antenna to drain, by gravity flow, directly to the bottom of the tube's cone-shaped end-part.

In one embodiment the tube is bent and the top end is mounted in the side of the vessel. In a preferred embodiment the top part of the tube is extending substantially horizontally into the reactor, then bent downwards into the liquid. In one embodiment the radius of the bend is about 90°. In another embodiment the radius of the bent is greater than 90°, for example 95 to 110°.

It is preferred that the radar cone be heated so as to further avoid condensation. Heating can be effected by electric tracing or any other means well known to the skilled person.

The tube contains at least one vent hole. In a preferred embodiment the vent hole is located below the bent of the tube. This ensures that no liquid enter the substantial horizontal part of the tube thus preventing submerging the radar antenna.

The tube has a bottom end as defined by a reflective surface. The reflective surface can have any form, as long as it is capable of reflecting radar waves in order to detect the end of the tube. This shape can be, e.g., a ring covering part of the bottom face of the tube, a grid, a closure plate comprising holes, or a fully tight closure plate. E.g., in one embodiment the tube comprises holes in the side of the tube in order to let liquid enter, and a closure at the bottom having one or more (small) holes that would allow draining of the liquid.

Either type of closure can be a flat plate, a curved welded end of the tube, or any other provision to ensure that the tube is closed off at the bottom. This closure should have a good reflection in order to detect the end of the tube. It will be understood that this provision may be adapted to the circumstances in the vessel, e.g. in the case of highly corrosive conditions, the closure will be made of a material withstanding these conditions.

The tube further comprises at least one hole for venting gas. This hole is provided at a position above the desired maximum of the liquid in the vessel. In the event of liquids that are subject to vigorous movement, such as boiling, the hole for venting gas will be positioned well above the expected maximum of the liquid.

The tube also comprises at least one hole for allowing liquid to enter it. The latter hole is positioned above the desired minimum level to be measured, and thus preferably near or at the bottom end of said tube. At the end of the tube, one hole will generally be present for draining purpose. It will be understood that, once the level of liquid should have fallen to below the hole for allowing liquid to enter the tube, no liquid will enter the tube, and the reflection measured will be the bottom end of the tube. Another advantage is that this can be used to calibrate the radar without a "water run", because the end of plate position is exactly known. This can be a desired embodiment, in the event that one is interested in knowing whether or not a certain minimum level is reached, in which case such minimum level can be correlated with the position of the hole. Preferably, however, the hole is near the bottom of the tube.

In connection herewith, a design can be used as provided in the aforementioned WO 2004/046663, which is incorporated herein by reference.

Surprisingly, the method of the invention is suitable for measuring the level of liquid in a vessel, in the specific circumstance that a supercritical fluid is present above said liquid. This is a challenging situation, since, e.g., the supercritical fluid will have a reduced discrimination potential with vapor, and also the di-electric constants can become more similar.

The at least one hole for allowing liquid to enter the tube, can be a single hole. The hole can have any shape, and can have a diameter of about 1-50 mm. A plurality of relatively small holes is preferred over a single relatively large hole. E.g., it is preferred to have 2-20 holes of diameter 2-20, preferably 3-10 mm, more preferably 5-15 holes of diameter 3-10 mm.

The tube itself can be straight, but it can also be bent. In the latter case, it will be understood that the bending should not be such as to create such a reflection at the site of bending, that this will override the reflection at the surface of the liquid. For installing radar equipment, it is preferred if this does not need to be done on top of the vessel, but at a side below the top. In this embodiment the tube will enter the vessel typically under an angle with the level of the liquid, and then be bent so as to further extend substantially vertically to the surface of the liquid. More preferably, the radar is located perpendicular to the surface of the liquid, preferably on top of the vessel. In this embodiment, the effects of condensation are reduced to a minimum.

The tube may have any cross-sectional shape. A circular, elliptical, or rectangular cross-section is preferred. The tube is preferably of metal. For use in the extremely corrosive circumstances of a urea reactor, the tube is preferably made of a duplex steel, of tantalum or of Zircone.

A preferred steel is a duplex ferritic-austenitic stainless steel having a high content of Cr and N, and a low content of Ni. A disclosure in this respect is WO 95/00674, the disclosure of which is incorporated by reference herein.

In another preferred embodiment, the tube is made of a duplex stainless steel consisting of, in percent by weight, C: 0.03% or less, Si: 0.5% or less, Mn: 2% or less, P: 0.04% or less, S: 0.003% or less, Cr: 26% or more, but less than 28%, Ni: 7.3-10%, Mo: 0.2-1.7%, W: more than 2%, but no more than 3%, N: more than 0.3%, but no more than 0.4%, with the balance being Fe and impurities, in which the content of Cu as an impurity is not more than 0.1%. This steel is described in U.S. Pat. No. 7,347,903, the disclosure of which is incorporated by reference into this description.

The preferred tube is made from a duplex, stainless steel alloy, containing, in percent by weight:

C: maximally 0.05%, preferably maximally 0.03%;
Si maximally 0.8%, preferably maximally 0.5;
Mn 0.3-4%, preferably 0.3-1%;
Cr 28-35%, preferably 29-33%;
Ni 3-10%;
Mo 1.0-4.0%, preferably 1.0-1.3%;
N 0.2-0.6%, preferably 0.36-0.55%;
Cu maximally 1.0%;
W maximally 2.0%;

S maximally 0.01%;
Ce 0-0.2%;
the remainder being Fe and normally occurring impurities and additives, the ferrite content being 30-70% by volume, preferably 33-35% by volume.

In the embodiments wherein the tube is made of anticorrosive material, and particularly of a duplex steel as defined above, the method of the invention is particularly suited to measure the level of liquid (carbamate solution) formed in a urea synthesis. The vessel in which the level of liquid is measured, in this embodiment, will be understood to be a urea synthesis reactor.

The invention, in another aspect, also pertains to a radar system suitable for being placed into a vessel, such as a chemical reactor. The system of the invention comprises a transmitter, a receiver and a tube connected at a top end to the transmitter and the receiver, and a bottom end that is closed off. The tube further comprising at least two holes at different distances from the bottom (so defining a possibility to vent gas as well as have liquid enter). According to the invention, the tube is preferably made of a duplex steel as defined above. The system further comprises a radio transmitter, a radio receiver, a signal processing device, and a display device to show the measurement results, which are familiar elements for the skilled person

The invention claimed is:

1. A radar method for detecting the level of a liquid which liquid is a carbamate solution formed in urea synthesis in a urea synthesis reactor wherein a supercritical fluid is present above said liquid,
the method comprising transmitting electromagnetic waves into the direction of said liquid carbamate solution through a tube provided in said urea synthesis reactor, wherein the tube extends to a bottom end placed within said reactor above a desired minimum level of said liquid, and wherein said bottom end is defined by a reflective surface,
the tube further comprising at least one hole for venting gas, and at least one hole for allowing liquid to enter.

2. A method according to claim 1, wherein the at least one hole for allowing liquid to enter the tube is positioned near or at the bottom end of said tube.

3. A method according to claim 1, wherein the at least one hole for allowing liquid to enter the tube comprises 2-20 holes of diameter 2-20 mm.

4. A method according to claim 1, wherein the tube extends substantially vertically into the liquid.

5. A method according to claim 1, wherein the tube enters the vessel from the side and has a bend and extends further downwards into the liquid, wherein the tube contains a vent hole below the bend in the tube.

6. A method according to claim 1, wherein the tube is made from a duplex ferritic-austenitic stainless steel having a high content of Cr and N, and a low content of Ni.

7. A method according to claim 6, wherein the tube is made from a duplex, stainless steel alloy, containing, in percent by weight:
C maximally 0.05%;
Si maximally 0.8%;
Mn 0.3-4%;
Cr 28-35%;
Ni 3-10%;
Mo 1.0-4.0%;
N 0.2-0.6%;
Cu maximally 1.0%;
W maximally 2.0%;
S maximally 0.01%;
Ce 0-0.2%;
the remainder being Fe and normally occurring impurities and additives, the ferrite content is 30-70% by volume.

8. A method according to claim 1, wherein the tube is cone-shaped on the inside adjacent to a radar cone.

9. A radar system suitable for being placed into a vessel, comprising a transmitter, a receiver and a tube connected at a top end to the transmitter and the receiver, and a bottom end that is closed off, the tube further comprising at least two holes at different distances from the bottom end, wherein the tube is made of a steel as defined in claim 6.

10. The radar system of claim 9 wherein the vessel is a urea synthesis reactor.

11. The method of claim 3 wherein the at least one hole for allowing liquid to enter the tube comprises 5-15 holes of diameter 3-10 mm.

12. The method of claim 7 wherein:
C is maximally 0.03%;
Si is maximally 0.5%;
Mn is 0.3-1%;
Cr is 29-33%;
Mo is 1.0-1.3%; and
N is 0.36-0.55%.

13. The method of claim 7 wherein the ferrite content is 33-35% by volume.

14. The method of claim 1 wherein said reflective surface is adapted for detecting the bottom of the tube and provides a restriction for entry of said liquid.

15. The method of claim 8 which comprises heating the radar cone.

16. The system of claim 9 wherein said bottom end comprises a reflective surface adapted for detecting the bottom of the tube.

17. The system of claim 9 wherein said bottom end has a shape which is a ring covering part of said bottom, a grid, a closure plate comprising holes or a tight closure plate.

* * * * *